United States Patent [19]

Riubrugent

[11] Patent Number: 5,645,869

[45] Date of Patent: Jul. 8, 1997

[54] MACHINE FOR SHAPING HAMBURGERS

[75] Inventor: Narcis Garganta Riubrugent, Girona, Spain

[73] Assignee: Industrias Gaser, S.L., Girona, Spain

[21] Appl. No.: 377,805

[22] Filed: Jan. 24, 1995

[30] Foreign Application Priority Data

Jan. 24, 1994 [ES] Spain ................... 9400125

[51] Int. Cl.⁶ .................................................. A22C 7/00
[52] U.S. Cl. .................. 425/149; 53/389.3; 425/170; 425/308; 425/437; 425/444
[58] Field of Search ...................... 425/149, 437, 425/444, 170; 53/389.3; 426/513; 264/335

[56] References Cited

U.S. PATENT DOCUMENTS

| | | | |
|---|---|---|---|
| 2,794,405 | 6/1957 | Vegt | 425/444 |
| 2,877,120 | 3/1959 | Bush | 53/389.3 |
| 2,915,957 | 12/1959 | Bowman | 425/437 |
| 3,347,176 | 10/1967 | Hall | 426/513 |
| 3,838,634 | 10/1974 | Alexandrov et al. | 425/139 |
| 3,909,881 | 10/1975 | Anderson | 425/116 |
| 3,913,175 | 10/1975 | Peterson | 425/233 |
| 4,751,029 | 6/1988 | Swanson | 425/444 |
| 5,129,810 | 7/1992 | Nakagaki | 264/335 |
| 5,145,690 | 9/1992 | Riubrugent | 425/298 |
| 5,445,512 | 8/1995 | Bradley et al. | 425/437 |
| 5,447,425 | 9/1995 | Hsu et al. | 425/149 |
| 5,489,200 | 2/1996 | McGrew et al. | 425/149 |

FOREIGN PATENT DOCUMENTS

| | | | |
|---|---|---|---|
| 3-58818 | 3/1991 | Japan | 425/170 |
| 6-71687 | 3/1994 | Japan | 425/170 |

*Primary Examiner*—Leo B. Tentoni
*Attorney, Agent, or Firm*—McGlew & Tuttle

[57] ABSTRACT

Improvements in a machine for shaping hamburgers, which include a table-frame with a horizontally displaceable mold into which mold the ground meat enters directly and which has an element for detecting the pressure of the meat. The element, when it is drawn back, produces a signal for starting up the machine. A device is provided for expelling the freshly shaped hamburger, which device has structure for preventing the hamburger from sticking. This structure includes a chamber inside the expelling device, through whose periphery atmospheric air escapes, a knife provided on its base with a conduit with openings, through which air escapes in order to detach the edges of flexible sheets enveloping the hamburger, and upper and lower rolls for supplying flexible sheet, which rolls have inertia brakes including a pair of motorized rollers, above which rests the respective coil.

18 Claims, 2 Drawing Sheets

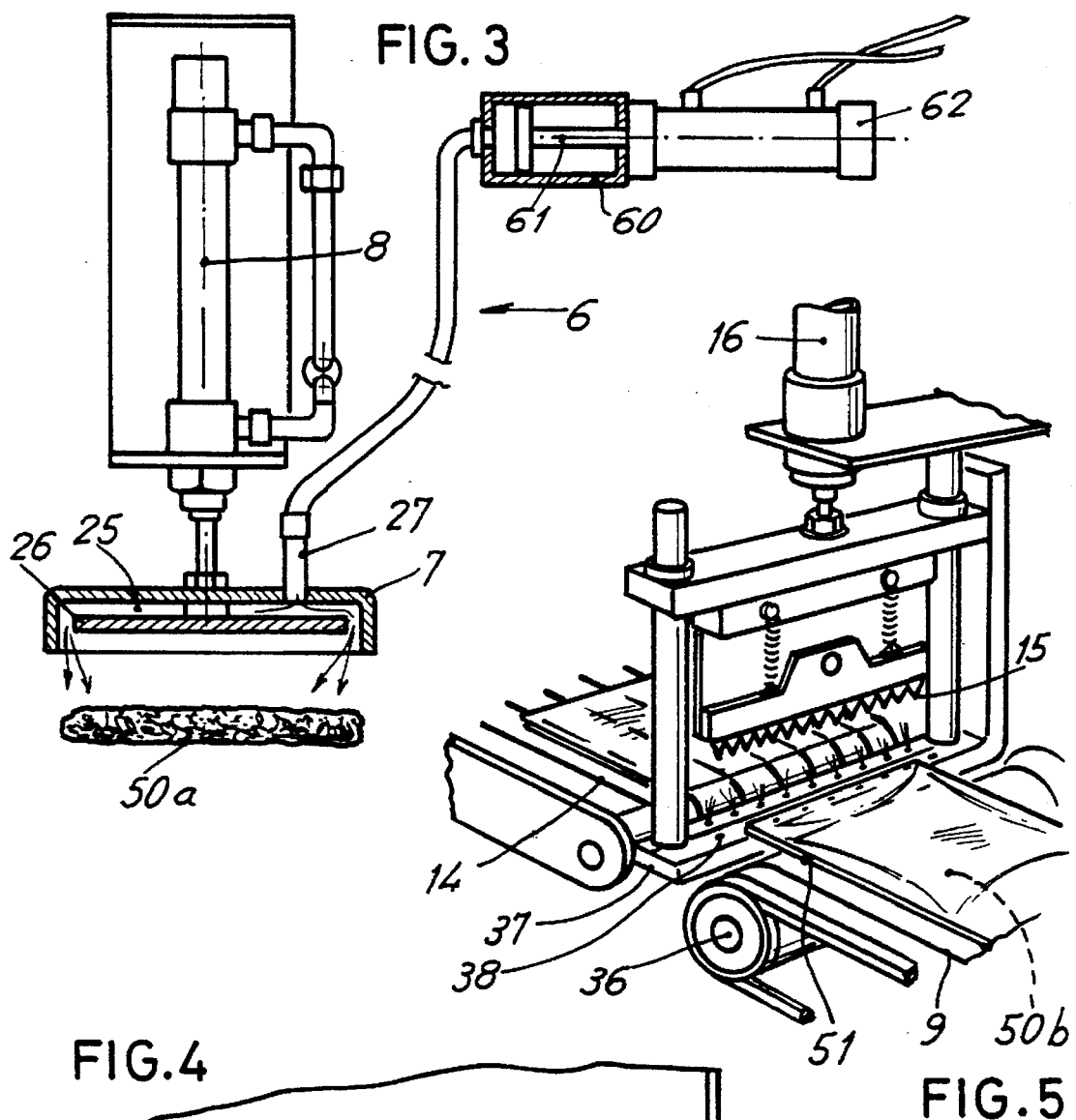
FIG. 3
FIG. 5
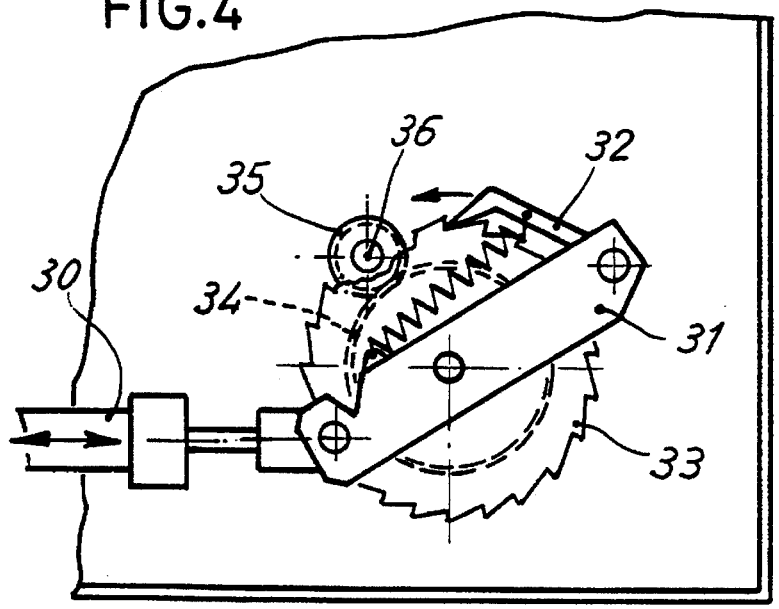
FIG. 4

MACHINE FOR SHAPING HAMBURGERS

FIELD OF THE INVENTION

The present invention relates generally to a machine for shaping hamburgers and more particularly to a hamburger shaping machine which offers numerous, substantial advantages of an operational nature over the various types of machines intended for the same purpose.

BACKGROUND OF THE INVENTION

Various machines of this type are known. These machines basically have a bedplate or table, where a portion of ground meat enters. This portion passes through and between two sheets of paper cellophane or the like, each sheet coming from a coil and then stopping below a die. The die shapes the portion of meat into a hamburger. The enveloping sheets of paper or the like are jointly cut.

Specifically, Patent No. ES-P-9,000,304 of the same applicant is known, which describes a machine for processing hamburgers, which consists of, in a table-frame body, a vertical cylinder having a very large diameter, whose upper part constitutes the loading chamber, for initially receiving the mass of ground meat, the upper base of the cylinder having an outlet opening fitted together with the position of a changeable mold, whose features determine the size and weight of the pieces of meat or hamburgers produced. These pieces of meat are extracted by a releasing device and are positioned above a conveyor belt, above which pieces of protective paper made of flexible sheet material, obtained from two belt rollers located above and below the plane of displacement, are each applied to the two surfaces. A knife cuts the said pieces of protective paper with the hamburger inserted between them. Then, a second conveyor belt transports the hamburgers to the outlet, in whose path there is an optoelectronic device connected to a control circuit, which controls the operation of four fluid-dynamic cylinders for actuating the different devices.

In practice, however, the machines of this type have shown the following various drawbacks:

- the large-diameter cylinder, which constitutes the chamber for loading the ground meat and whose upper end fills the mold, is imprecise and cannot guarantee the same compactness or weight for all hamburgers;
- many times the hamburger itself sticks to the device for releasing or expelling the hamburger contained in the mold to the conveyor belt, obstructing the running of the machine;
- the optoelectronic device for detecting the passing of the hamburgers is capable of being spattered with a small portion of ground meat, thus giving an incorrect order to the control circuit, which is expressed as the inappropriate actuation of the knife, which disadvantageously cuts a hamburger in half;
- even when the knife functions at the right time, it often happens that the freshly cut edge of paper sticks to the lower base of the knife, also obstructing the normal operation of the machine.

SUMMARY AND OBJECTS OF THE INVENTION

It is an object of the invention to provide a machine which solves the drawbacks indicated above.

According to the present invention, a conduit for supplying ground meat is provided, where the conduit can be connected to an auxiliary grinding or stuffing machine, known in itself. The conduit flows into the interior of the mold in the loading position, and an adjustable element is provided for detecting the pressure of the ground meat within the mold as well. When this ground meat has reached the predetermined pressure, the operation for shaping hamburgers is started, guaranteeing an equal compactness and weight for all hamburgers. Antistick means is provided for preventing the hamburger from sticking to the device and for shaken hamburger out of the mold. A first conveyor belt has an intermittent-feed movement, which stops when the hamburger, freshly enveloped with flexible sheet, is exactly in front of a cutting means. The knife or cutting means avoids untimely and inappropriate cuts, and detaching means are provided for detaching the edges of flexible sheet enveloping the hamburger from the base of the knife.

BRIEF DESCRIPTION OF THE DRAWINGS

FIG. 3 is a detail view of the device for expelling the hamburger from the mold according to III of FIG. 1;

FIG. 4 is a detail view of the mechanism for operating the first conveyor belt step by step; and FIG. 5 is a perspective view of the knife for cutting the protective sheets of paper according to the cut plane V—V of FIG. 1.

DETAILED DESCRIPTION OF THE PREFERRED EMBODIMENT

Figure 1:
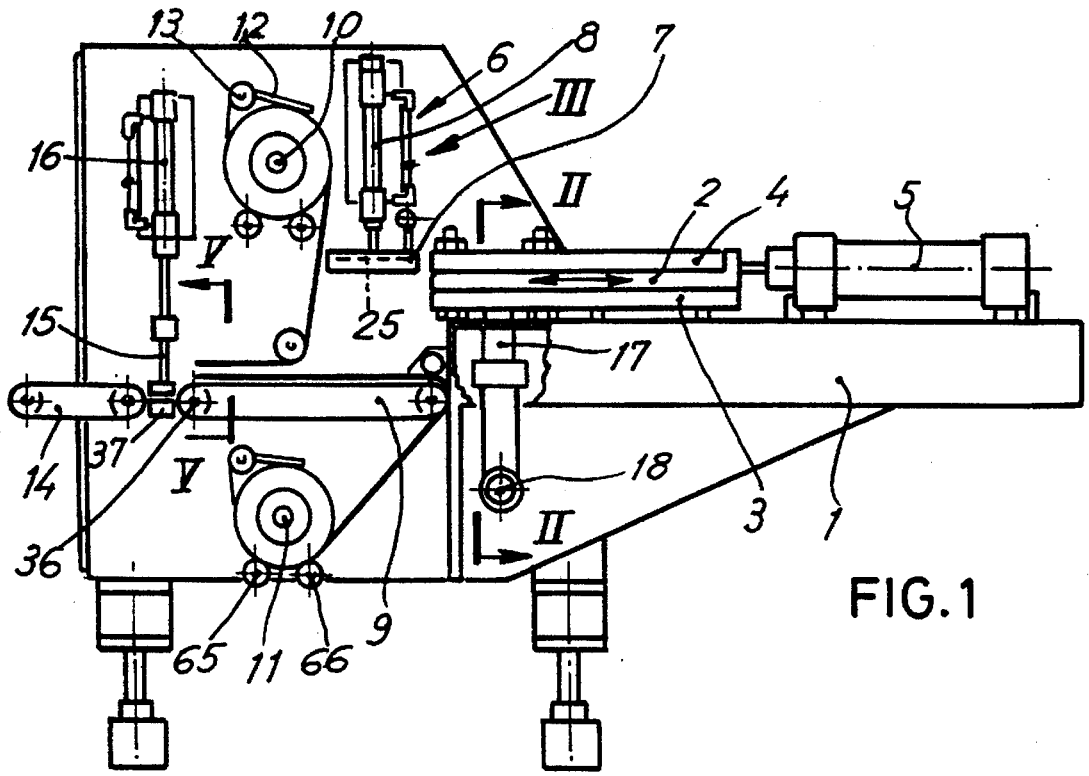
FIG. 1 is a general, elevated view of the machine, according to the present invention.

Referring to the drawings and in particular to FIG. 1, the machine for shaping hamburgers, which is the object of the improvements according to the present invention, is comprised of: a table-frame 1, which supports a mold 2 that is horizontally slidable between the two plates 3, 4 and is actuated by a first fluid-dynamic cylinder 5, a device or expelling means 6 for expelling the freshly shaped hamburger, which mainly is comprised of a plate 7 in the form of an inverted pan and of the second fluid-dynamic cylinder 8. Below the expelling device, there is a first conveyor belt 9. Above and below first conveyor belt 9 there are respective rolls providing webs of flexible sheet material 10, 11, such as paper, cellophane or the like. These rolls are each provided with inertia brakes 12 and means for detecting 13 the end of the flexible sheet. A second outlet conveyor belt 14 is provided and between the second conveyor belt 9 and the first conveyor belt 9, there is a knife device 15, which is actuated by a third fluid-dynamic cylinder 16. Everything is controlled by an electronic circuit and by means of a program which brings about the sequential actuation of the cylinders by means of respective solenoid valves (not shown). The second conveyor belt may be comprised of a series of endless strands 14.

Fundamental in the improvements of the present invention is the fact that a conduit 17 for supplying ground meat, flows into the mold 2 in the loading position. This circuit 17 is connected at end 18 to an auxiliary, meat-stuffing and/or meat-grinding type machine, which is known in itself and not shown.

Figure 2:
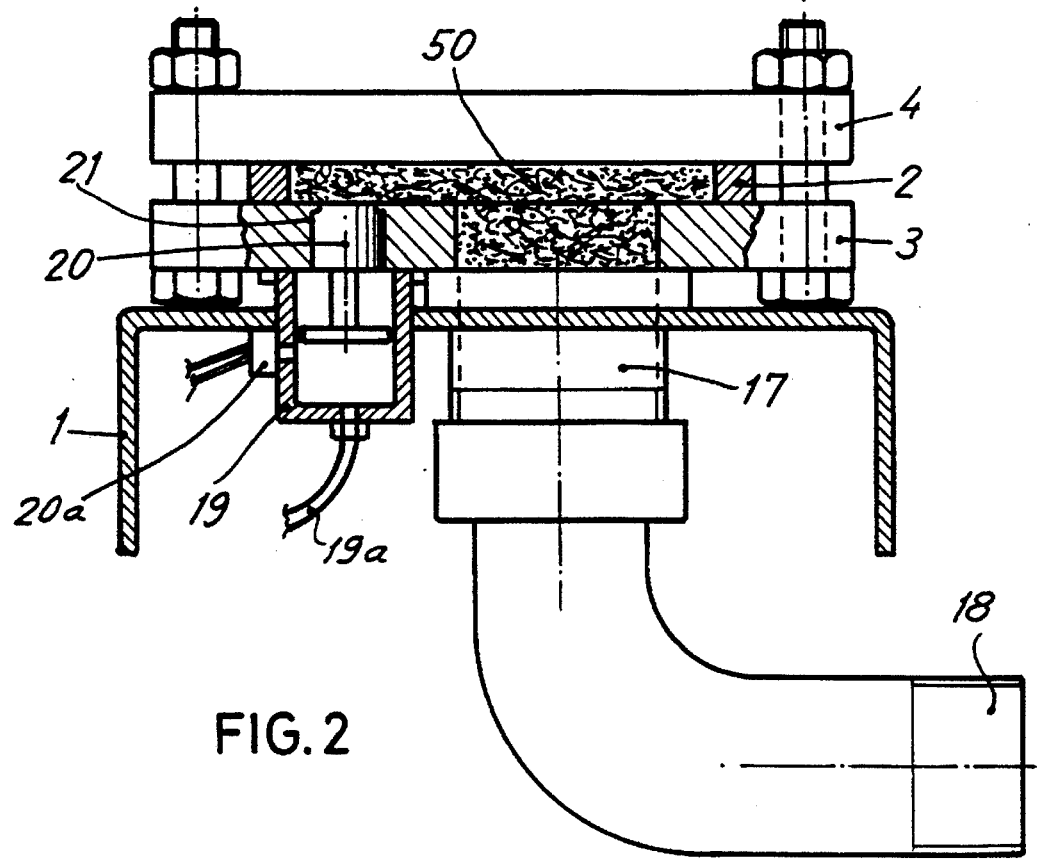
FIG. 2 is a cross sectional view made through the plane II—II of FIG. 1.

The inclusion of an element or detecting means 19 for detecting the pressure of the interior of the mold 2 is also emphasized (FIG. 2). This element or detecting means 19 is comprised of a rod 20, whose free end has access to the interior of the said mold through an opening 21 of the plate 3. An adjustable pressure, either by a spring or by compressed air 19a, which keeps the rod 20 elevated and level with the mold 2, prevails in the interior of the element 19. When the ground meat 50, which fills the mold 2, reaches a certain compactness, the rod 20 must come down lightly, overcome this pressure and thus establishing a signal by moving in front of a "reed" type relay 20a, which brings about the starting and sequential actuation of the various elements of the machine such as the expelling means six.

The spring or compressed air 19a can be adjusted with the aim of slowing down or speeding up the response in order to obtain a hamburger 50 that is more or less dense, compact, and finally, has greater or less weight.

On the other hand, it should be emphasized (FIG. 3) that the antistick means for preventing the hamburger from sticking are incorporated in the device 6 for expelling the hamburger 50a, which consists of the plate 7 and the second cylinder 8. The antistick means includes a narrow chamber 25 inside the plate or inverted pan 7, which is determined by the wall or punch 26 that is very close to the roof of the plate 7. This chamber 25 is open along the entire interior periphery of the plate 7. A conduit 27 flows into the chamber 25. This conduit 27 is connected to a plenum chamber 60 of atmospheric air in such a manner that, when the plate 7 ascends the air escaping through the periphery of the chamber 25 detaches the edges of the hamburger 50a, which may have become stuck there.

In fact, when dealing with food products, regulations often do not permit the use of air treated mechanically, such as by a compressor. The plenum chamber 60 is formed by a cylinder provided inside a piston, whose backward and forward movement, produced by a pneumatic cylinder 62 operated in a manner synchronized with the operation of the machine by means of the program of the electronic circuit itself, first produces the aspiration of the atmospheric air through the tube 27 and then its expulsion through the periphery of the chamber 25.

Equally important is the provision of the first conveyor belt 9 with an intermittent-feed movement, which is facilitated by a fourth fluid-dynamic cylinder 30 (FIG. 4). A lever 31, a ratchet 32 and its ratchet wheel 33, which is jointly shared with a pinion 34, meshes with another pinion 35 for driving the axle 36 of the first conveyor belt 9. When the cylinder 30 pushes its rod, the lever 31 oscillates, and the ratchet 32 turns its wheel 33 and connected pinions 34, 35, when the cylinder 30 retracts its rod, the ratchet 32 obviously slips on its wheel 33, and the first conveyor belt 9 remains stopped.

It is in this stopping of the first conveyor belt 9 that the hamburger 50b is exactly in front of the knife or cutting means 15, which descends, cutting the paper correctly. In this way imbalances of other machines are avoided, which would bring about the inappropriate cutting of the hamburger in half.

A detachment means includes a conduit 37 with various orifices 38, through which air escapes, and is arranged on the lower base of the knife 15 (FIG. 5). This prevents the edges of paper or flexible sheet 51, freshly cut by the knife 15, from remaining stuck to the base by detaching edges of the flexible sheet from the cutting means.

Despite having the inertia brakes 12 so that the coils of flexible sheet 10 and 11 do not gather inertia when pulling them at a sufficient speed, two rollers 65, 66 are incorporated into each of them, which support same and, at the same time, give them traction. The peripheral velocity of these rollers 65, 66 is equal to that of the conveyor belt. The traction (not shown) of the rollers is created by the axle 36 of the conveyor belt 9. Nevertheless, it is possible to pull only the upper coil 10.

In its essence, the present invention can be put into practice in other embodiments, which differ only in detail from that embodiment indicated by way of example and which also achieve the protection that is claimed. These improvements can thus be made in a machine for shaping hamburgers with the most suitable means, components and accessories, for everything to remain understood in the spirit of the following claims.

What is claimed is:

1. A hamburger-shaping machine, comprising: a table-frame; a mold disposed above the table-frame, the mold being horizontally displaceable between a first position for loading ground meat to a second position for unloading a hamburger that has been shaped; a first conveyor belt positioned adjacent said second position of said mold; expelling means for expelling the hamburger above the first conveyor belt; an upper roll of flexible sheet material, said upper roll being above a plane of displacement of the hamburger along said first conveyor belt; a lower roll of flexible sheet material, said lower roll being below said plane of displacement of the hamburger along said first conveyor belt; a second conveyor belt positioned at a downstream end of said first conveyor belt; cutting means for cutting said flexible sheets between said first conveyor belt and said second conveyor belt; conduit means for supplying ground meat, said conduit means being connected to a ground meat supply and being connected to said mold for supplying ground meat to an interior of said mold; adjustment means for detecting a pressure of ground meat within said mold and generating a signal for initiating an operation for expelling the hamburger; antistick means for preventing the hamburger from sticking to said expelling means by using atmospheric filtered air; an intermittent first conveyor belt drive for intermittent-feed movement of said first conveyor belt for stopping the hamburger which has been freshly enveloped with flexible sheet, in front of said cutting means; detachment means for detaching edges of flexible sheet enveloping the hamburger from said cutting means; and inertia brake means for braking a feed of said upper roll and said lower roll.

2. A hamburger shaping machine according to claim 1, wherein said adjustment means includes a rod sticking out through an inside of said mold, wherein pressure of meat within said mold is capable of drawing back and establishing a connection for starting said machine, and including means for adjusting said drawing back.

3. A hamburger shaping machine according to claim 2, wherein said expelling means includes a plate, said antistick means is comprised of a chamber established inside the plate; a conduit for filtered atmospheric air being connected to said chamber, said chamber having an opening on its perimeter for the outlet of said air to the hamburger to be expelled.

4. A hamburger shaping machine according to claim 1, wherein:
    said detachment means includes a conduit with a base and said base being provided with multiple openings for driving air.

5. A hamburger shaping machine according to claim 2, wherein:
    said detachment means includes a conduit with a base and said base being provided with multiple openings for driving air.

6. A hamburger shaping machine according to claim 1, wherein said inertia brake means of the upper and lower roll of flexible sheet includes a pair of motorized rollers, above which each respective roll rests, and the peripheral velocity of which is equal to that of the first conveyor belt.

7. A hamburger shaping machine according to claim 2, wherein said inertia brake means of the upper and lower roll of flexible sheet includes a pair of motorized rollers, above which each respective roll rests, and the peripheral velocity of which is equal to that of the first conveyor belt.

8. A hamburger machine comprising:

a mold movable between a first position and a second position;

conduit means for supplying ground meat to said mold in said first position;

detecting means for detecting a pressure of the ground meat in said mold, said detecting means generating a signal when said pressure of the ground meat is greater than a predetermined pressure;

moving means for moving said mold from said first position to said second position said moving means starting operation upon receipt of said signal, expelling means for expelling the ground meat from said mold by atmospheric air.

9. A machine in accordance with claim 8, further comprising: placing means for placing the expelled ground meat between two sheets and cutting the two sheets.

10. A machine in accordance with claim 8, wherein:

said expelling means includes antistick means for preventing the ground meat from sticking to said expelling means.

11. A machine in accordance with claim 10, wherein:

said expelling means includes a punch positionable adjacent one side of the ground meat in said mold, said antistick means includes a wall positioned around said punch, said plate and said punch defining a chamber extending around an outer radial edge of said punch, said antistick means including means for expulsion of air in said chamber to remove the ground meat from said punch.

12. A machine in accordance with claim 9, wherein:

said placing means includes cutting means for passing a knife though the two sheets;

said placing means includes a conveyor means with intermittent-feed movement means for receiving the ground meat from said expelling means, moving the expelled ground meat toward said cutting means and stopping the expelled ground meat at a position adjacent said cutting means during passing of said knife through the two sheets.

13. A machine in accordance with claim 12, wherein:

said cutting means includes a base, said knife stopping at said base after passing through the two sheets;

said placing means includes detachment means for detaching one of the two sheets from said base.

14. A machine in accordance with claim 13, wherein:

said detachment means includes an air conduit with a plurality of openings on said base, said base being contactable with the one sheet.

15. A machine according to claim 12, further comprising:

means for supporting a roll of one of the two sheets;

inertia brake means for braking a feed of the roll, said inertia brake means including a pair of motorized rollers, above which the roll rests, a peripheral velocity of said rollers being substantially equal to a velocity of said intermittent conveyor means.

16. A machine in accordance with claim 12, wherein:

said cutting means includes a base, said knife stopping at said base after passing through the two sheets;

said placing means includes detachment means for preventing one of the two sheets from remaining stuck to said base.

17. A hamburger-shaping machine, comprising: a table-frame; a mold disposed above the table-frame, the mold being horizontally displaceable between a first position for loading ground meat to a second position for unloading a hamburger that has been shaped; a first conveyor belt positioned adjacent said second position of said mold; expelling means for expelling the hamburger above the first conveyor belt, said expelling means including a plate; an upper roll of flexible sheet material, said upper roll being above a plane of displacement of the hamburger along said first conveyor belt; a lower roll of flexible sheet material, said lower roll being below said plane of displacement of the hamburger along said first conveyor belt; a second conveyor belt positioned at a downstream end of said first conveyor belt; cutting means for cutting said flexible sheets between said first conveyor belt and said second conveyor belt; conduit means for supplying ground meat, said conduit means being connected to a ground meat supply and being connected to said mold for supplying ground meat to an interior of said mold; adjustment means for detecting a pressure of ground meat within said mold and generating a signal for initiating an operation for expelling the hamburger; antistick means for preventing the hamburger from sticking to said expelling means, said antistick means including a chamber established inside the plate; a conduit for filtered atmospheric air being connected to said chamber, said chamber having an opening on its perimeter for the outlet of said air to the hamburger to be expelled; an intermittent first conveyor belt drive for intermittent-feed movement of said first conveyor belt for stopping the hamburger which has been freshly enveloped with flexible sheet, in front of said cutting means; detachment means for detaching edges of flexible sheet enveloping the hamburger from said cutting means; and inertia brake means for braking a feed of said upper roll and said lower roll.

18. A hamburger machine comprising:

a mold movable between a first position and a second position;

conduit means for supplying ground meat to said mold in said first position;

detecting means for detecting a pressure of the ground meat in said mold, said detecting means generating a signal when said pressure of the ground meat is greater than a predetermined pressure;

expelling means for expelling the ground meat from said mold, said expelling means starting operation upon receipt of said signal, said expelling means including antistick means for preventing the ground meat from sticking to said expelling means, said expelling means includes a punch positionable adjacent one side of the ground meat in said mold, said antistick means includes a pan positioned around said punch, said punch and said pan defining a chamber open along an entire periphery of said punch, said antistick means including means for expulsion of air in said chamber to remove the ground meat from said punch.

* * * * *